United States Patent [19]
Aten

[11] Patent Number: 5,405,923
[45] Date of Patent: Apr. 11, 1995

[54] SUSPENSION POLYMERIZATION OF TFE

[75] Inventor: Ralph M. Aten, Vienna, W. Va.

[73] Assignee: E. I Du Pont de Nemours and Company, Wilmington, Del.

[21] Appl. No.: 236,852

[22] Filed: May 2, 1994

[51] Int. Cl.⁶ ............................ C08F 2/18; C08F 14/26
[52] U.S. Cl. ...................................... 526/73; 526/206; 526/255
[58] Field of Search .......................... 526/255, 73, 206

[56] References Cited

U.S. PATENT DOCUMENTS

| | | | |
|---|---|---|---|
| 2,393,967 | 2/1946 | Brubaker | 260/80 |
| 3,462,401 | 8/1969 | Kometani et al. | 260/92.1 |
| 3,624,064 | 11/1971 | Toyoda et al. | 260/92.1 |
| 4,189,551 | 2/1980 | Gangal | 526/74 |
| 4,481,343 | 11/1984 | Herisson | 526/255 |
| 5,153,285 | 10/1992 | Felix et al. | 526/206 |

Primary Examiner—Joseph L. Schofer
Assistant Examiner—N. Sarofim
Attorney, Agent, or Firm—Edwin Tocker

[57] ABSTRACT

A process for suspension polymerization of tetrafluoroethylene to polytetrafluoroethylene is characterized by starting reaction at low temperature and increasing temperature to higher temperature during the reaction.

4 Claims, 1 Drawing Sheet

SUSPENSION POLYMERIZATION OF TFE

FIELD OF THE INVENTION

This invention is in the field of suspension processes to make polytetrafluoroethylene.

SUMMARY OF THE INVENTION

Two general processes for polymerizing tetrafluoroethylene (TFE) to make polytetrafluoroethylene (PTFE) are well known, each leading to polymer with distinctly different properties. The emulsion (dispersion) process for polymerizing TFE yields an aqueous dispersion of PTFE particles having typical average diameter of about 0.2 $\mu$m. PTFE dispersion particles ordinarily have a characteristic property of fibrillating under shear stress. The dispersion product of polymerization may be concentrated and/or stabilized and used as an aqueous dispersion, or may be coagulated and dried to obtain a PTFE resin that is variously called coagulated dispersion resin or fine powder. Articles are usually fabricated from fine powder by a lubricated extrusion (paste extrusion) process at temperature near room temperature, utilizing the fibrillatable character of the dispersion particle, followed by removal of the lubricant and then by fixing (sintering) of the PTFE. The suspension process for polymerizing TFE, usually involving vigorous agitation of the aqueous medium, yields non-fibrillatable solid particles that typically are irregular, fibrous, and coarse. The raw PTFE resin is commonly subjected to various finishing operations such as cutting, or cutting and pelletizing, to obtain resins with desired processing characteristics. PTFE resins derived from suspension polymerization of TFE (granular PTFE) are typically fabricated into finished articles by compacting at room temperature and then sintering, optionally followed by machining, i.e., by techniques adapted from powder metallurgy.

Numerous variations of the suspension process for polymerizing FFE are equally well known, such as the use of different initiators, different pressures, different surfactants, assorted additives to control polykettle adhesions, various fluorocarbon or chlorofluorocarbon liquids to affect particle physical characteristics, different monomers in minor concentrations in addition to TFE to modify sintering properties, and so on.

It is also known to use different reaction temperatures in the suspension process. Suspension polymerization of TFE at elevated temperature, for example at 50°-100° C. as exemplified by Brubaker in U.S. Pat. No. 2,393,967, gives higher reaction rate and an advantage in space-time yield at constant cooling capability. Polymerization at constant 65° C. temperature in the presence of selected carboxylic acid is exemplified by Gangal in U.S. Pat. No. 4,189,551. Polymerization at temperatures as low as 3° C. in the presence of a water-insoluble organic liquid is illustrated by Kometani et al. in several examples of U.S. Pat. No. 3,462,401. Suspension polymerization of TFE in the presence of an inert gas is exemplified at temperatures of 15° C. and 70° C., in the latter case with perfluoro(propyl vinyl ether) also present in low concentration, by Felix et al. in U.S. Pat. No. 5,153,285 wherein it is stated that the temperature is kept essentially constant during the course of polymerization. The properties of granular PTFE made at low temperature are desired for some purposes. After many years of development of suspension polymerization of TFE, the practice has been to accept a production penalty to obtain properties of PTFE yielded by low-temperature polymerization. A choice has been made between high-temperature polymerization yielding one set of properties at high space-time yield and low-temperature polymerization at low space-time yield to obtain different properties. It would be very attractive to have a suspension process yielding such properties at rates approaching those of high-temperature polymerization without the investment in heat transfer capacity necessary to keep temperature low at such rates.

Toyoda et al. in U.S. Pat. No. 3,624,064 disclose a suspension polymerization process for fluorinated monomers including TFE in which the reaction is started with the monomer primarily in the liquid state at a temperature below the critical temperature of the monomer. Later in the process, the temperature is increased above the critical temperature to reduce polymerization time and to increase yield. The temperature increase may be step-wise, with resultant pressure increasing above the starting pressure, or gradual to maintain constant pressure in the autoclave. The temperature raising time is stated, in general, to be the time at which the polymerization yield reaches a value of 80–95% of the total monomer charge. This time, signaled by a pressure drop in the autoclave, probably corresponds to depletion of the monomer liquid phase. In the only example of TFE polymerization, the initial polymerization temperature was 25° C. though a much lower temperature was used during the step of charging TFE to the autoclave. When pressure began to drop after 10 hr, temperature was raised to 45° C., apparently step-wise. From the data given, the space-time yield is calculated to be 0.19 g/l·min.

The present invention solves the problem of being able to obtain the properties of PTFE yielded by the low-temperature suspension process only with sacrifice in production rate by providing a process that gives both the properties of low-temperature polymerization and high space-time yield.

SUMMARY OF THE INVENTION

This invention provides an improved process for suspension polymerization of tetrafluoroethylene using an aqueous medium and in the presence of polymerization initiator to form non-fibrillatable polytetrafluoroethylene, the improvement comprising
 (a) starting the polymerization at a temperature of up to about 20° C.,
 (b) permitting said temperature to increase to an elevated temperature of at least about 30° C. as polymerization progresses, and
 (c) substantially completing the polymerization at said elevated temperature
to obtain as a result thereof polytetrafluoroethylene, having shrinkage characteristic of polytetrafluoroethylene polymerized entirely at said starting temperature, at production rate greater than obtained when polymerization is carried out entirely at said starting temperature.

DETAILED DESCRIPTION

Figure 1:
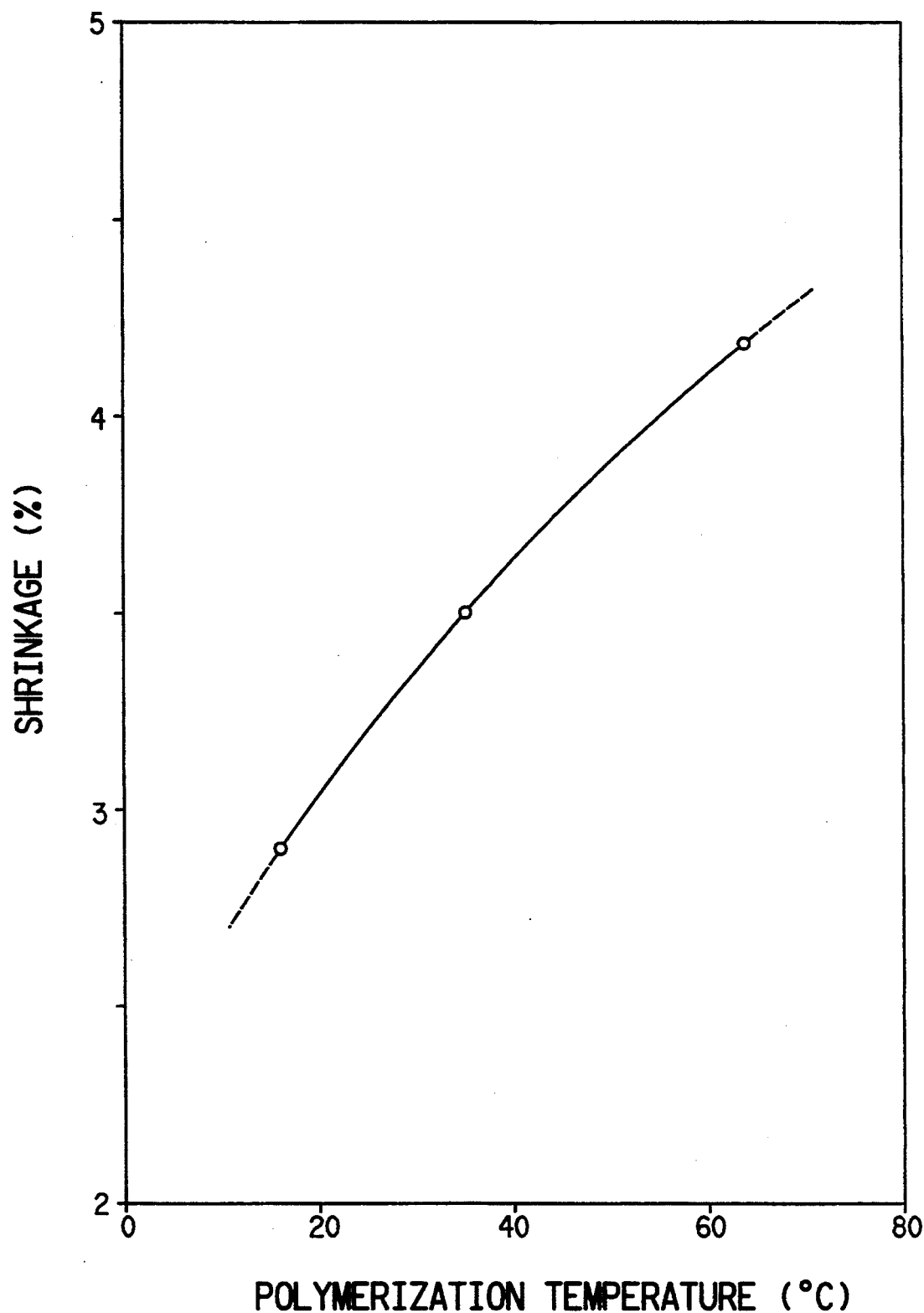
FIG. 1. Plot of shrinkage vs. nominal reaction temperature for suspension polymerization of TFE as conducted in Comparative Examples A–C.

It has been discovered that PTFE can be made by a suspension process in which the temperature starts at a low value and increases to higher value as polymerization progresses, but which surprisingly yields PTFE having properties similar to those of polymer made at constant temperature equal to the low starting temperature, even though a substantial fraction of the PTFE is formed at higher temperature.

PTFE made by the process of this invention has the general non-fibrillatable character of PTFE made by previously-known suspension polymerization processes. Such product, after any appropriate finishing operations such as cutting, or cutting and pelletizing, is also known as granular resin, or as molding resin, and may be used as ram extrusion rein. Suspension-polymerized PTFE is usually of such high molecular weight that the polymer is considered to be non-melt-fabricable. Such molecular weight ordinarily corresponds to standard specific gravity (SSG) of less than 2.25, and more commonly to SSG of less than 2.20, SSG being a parameter that decreases with increasing molecular weight. The general relationship between SSG and number average molecular weight is well known. See, for example, Sperati & Starkweather, Fortschr. Hochpolym-Forsch. 2,465 (1961).

Optionally, small amounts of at least one comonomer can be used. Such comonomers are illustrated by, for example, perfluorobutyl ethylene and perfluoro(alkyl vinyl ether) such as perfluoro(propyl vinyl ether). The concentration of optional comonomer is sufficiently low that the polymer is still non-melt-fabricable. Optional comonomer concentration in the polymer will generally be less than 0.2 mol %, usually much less. TFE polymer containing such low concentrations of comonomer is often called modified PTFE. As used herein, "PTFE" is intended to cover modified PTFE as well as true PTFE homopolymer.

The process of this invention is similar to TFE suspension polymerizations known in the art, except for temperature control. A typical suspension polymerization process involves the steps of precharging a liquid medium to a stirred autoclave, precharging small amounts of other ingredients, deoxygenating, pressuring with TFE to predetermined level, agitating, bringing the system to desired temperature, introducing initiator, adding more TFE according to predetermined basis, and regulating temperature. The suspension process for polymerization of TFE is typically conducted in aqueous medium. Water is convenient, liquid over a broad temperature range, essentially non-telogenic when impurities are reduced to low level, inexpensive, and safe. The process of this invention uses an aqueous medium. In prior-art suspension polymerization processes, recipe and operating parameters not fixed by the equipment are commonly selected in order that temperature is maintained approximately constant throughout the polymerization.

Any workable pressure can be used in the process of this invention. High pressure offers an advantage over low pressure in increased reaction rate. However, the polymerization of TFE is highly exothermic, so high reaction rate increases the heat that must be removed or accommodated as temperature increases. Pressures that can be used are also determined by equipment design and by safety concerns in the handling of TFE. Generally, pressures in the range of about 0.3-7 MPa are known for suspension polymerization of TFE, and pressures in the range 0.7-3.5 MPa are common. While it is common to maintain constant TFE pressure, pressure can be varied.

Initiators that can be used in the practice of this invention include any free radical initiator for TFE polymerization that is effective over the temperature range to be employed. Since the process of this invention starts at low temperature, the initiator should generate radicals at adequate rate at low temperature. Preferred initiators include, for example, potassium permanganate systems, and various other redox systems such as ammonium persulfate/bisulfite/iron sulfate or bromate/bisulfite.

Other ingredients can be used in recipes for TFE polymerization by the process of this invention. Such other ingredients include, for example, surfactants, additives to minimize formation of autoclave adhesions, color inhibitors, and the like as known to one skilled in the art. Such other ingredients are usually, but not necessarily, introduced into the autoclave as part of the precharge. If the recipe is to yield modified PTFE, comonomer is commonly included in the precharge, but comonomer properties such as reactivity and volatility would influence time and method of addition.

The process of this invention is characterized by starting TFE polymerization at low temperature, permitting temperature to increase to higher temperature as polymerization progresses, and substantially completing polymerization at higher temperature. Polymerization starting temperature is considered to be the measured temperature at the time polymerization starts (kick-off), as kick-off is normally determined. Commonly, kick-off is sensed by a decrease in pressure, indicating that reaction is consuming TFE. Since an aqueous medium is used, polymerization starting temperature must be high enough that the water is in the liquid state, considering the effect of dissolved ingredients and operating pressure on freezing point. Desirably, starting temperature is up to about 20° C. Preferably, starting temperature is in the approximate range 0°-20° C. During polymerization, the temperature reaches at least about 30° C., preferably at least 35° C., and most preferably at least 40° C. Temperature may increase continuously throughout the batch, but highest temperature is not necessarily realized at the end of the batch. For example, one might reduce pressure to slow the reaction or employ a react-down procedure to consume residual monomer in the polymerization vessel, accompanied by decrease in temperature. It is contemplated that the reaction is substantially completed at higher temperature reached during polymerization as recited above, recognizing the possibilities of various temperature profiles, also as discussed above. To achieve substantial benefit from the process of this invention, it is desired that at least about 35% of PTFE formed during the batch is formed at temperature above 20° C., preferably at least 45%, and most preferably at least 55%. "Substantially completed at higher temperature" is to be interpreted to mean that the fraction of total PTFE formed during the batch that is formed at temperature above 20° C. is as recited in the previous sentence. Even more preferably, these fractions of total PTFE formed are formed at about 30° C. or above.

If heat transfer capability is adequate, one can control the temperature profile by regulating the heat transfer system to raise the temperature as desired. However, a particular advantage of the process of this invention is realized in exceeding the heat transfer capability of polymerization equipment in any given configuration, thereby achieving reaction rates in excess of that corresponding to the heat transfer limit. A preferred mode of operation is to set heat transfer at a high level consistent with equipment design and operating economics, and then control temperature through selection of recipe variables, such as amount of initiator or use of surfactant, and of operating parameters such as TFE pressure. While TFE pressure is maintained constant in the following examples of the invention, except for a reactdown procedure at the end of the batch, pressure can be varied to influence reaction rate and thereby heat generated and consequently temperature. Thus, in the practice of this invention, one can cause temperature to increase by regulation of heat transfer, by choice of recipe, by control of operating parameters, and the like. The phrase "permitting temperature to increase" is intended to encompass all such modes of temperature regulation. Normally, polymerization continues as temperature increases above the starting temperature.

EXAMPLES

The polymerizations described in the example and comparative examples below were all conducted in a 37.9-liter stainless steel autoclave encased in a jacket through which heat transfer fluid was circulated for heating or cooling purposes. This autoclave was equipped with a two-bladed, 45-degree angled, flat downdraft agitator mounted on a vertical shaft. Temperature in the vapor space was measured by a thermocouple in a small well near the top of the autoclave. Pressures reported in the following are on an absolute basis.

Wet PTFE product of polymerization was finished by cutting at about 3°–7° C. in a high speed comminuting machine (Model VFSTS-06-SSB, Taylor, Stiles & Co.) and then drying in a circulating air oven for 24–48 hr at about 150° C.

Average particle size of the resultant PTFE resin was measured on a Sharples Micromerograph (Model XC, Val-Dell Company).

Finished PTFE resin was characterized according to ASTM Specification D-4894 which describes procedures for molding, sintering, determination of standard specific gravity (SSG, an indirect measure of molecular weight), and determination of shrinkage. Shrinkage is the parameter used herein to illustrate the benefit of the invention, recognizing that shrinkage is not determined solely by polymerization temperature, as known in the art. SSG was kept approximately constant in these tests to elimate molecular weight as a variable.

Reported space-time yields were based on the volume of the empty autoclave and on two different times, both measured from the start of polymerization (kickoff), at which point the feed valve was opened to add TFE continuously. The end point for the first time was the closing of the TFE feed valve. The end point for the second time was the venting of the autoclave. These two end points coincided in one test.

COMPARATIVE EXAMPLE A

The autoclave was charged with 21.3 l of demineralized water, 1 g of oxalic acid and 0.2 g of potassium meta-bisulfite. Oxygen was then removed from the autoclave by alternately pressuring with 1540 g of TFE and evacuating. The autoclave was pressured to 2.17 MPa with TFE, cooled to 15° C., and agitated at 700 rpm. A solution of potassium permanganate (0.008 g/l) was continuously injected at 25 ml/min into the autoclave for the duration of the batch. After 16 min of initiator solution injection, a slight pressure drop was observed indicating start of polymerization (kickoff), the TFE feed valve was opened, and additional TFE monomer was continuously fed into the autoclave to maintain the pressure at 2.17 MPa during the subsequent course of the reaction. During the course of the reaction, the maximum temperature observed in the vapor space was 18° C. After 100 min of reaction measured from kickoff, 5080 g of TFE had been converted into polymer. At this point the TFE feed valve was closed and the autoclave was vented from 2.17 MPa. Space-time yield was 1.34 g/l·min. The polymer was recovered, cut to 18 μm average particle size, and dried. The SSG was 2.167, and the shrinkage was 2.9%.

COMPARATIVE EXAMPLE B

The autoclave was charged with 21.8 l of demineralized water, 0.7 g of ammonium perfluorooctanoate (C-8), and 0.0023 g of an ocytlphenol polyethoxyethanol surfactant (Triton ®X-100, Rohm & Haas), as 10 ml of 0.023 g/l solution, and purged of oxygen as before. The autoclave was pressured to 1.83 MPa with 1090 g of TFE, heated to 35° C. and agitated at 700 rpm. To initiate the reaction, 0.75 g of ammonium persulfate (APS) was added as 300 ml of 2.5 g/l solution at 50 ml/min for 6 min, then 0.075 g of potassium permanganate was added as 150 ml of 0.5 g/l solution at 50 ml/min for 3 mi. After kickoff, the pressure was maintained at 1.83 MPa by continuously feeding TFE monomer. During the course of the reaction, the maximum temperature observed in the vapor space was 41 ° C. At 33 min after the TFE feed valve was opened, 4540 g of TFE had been fed to maintain pressure. The agitator speed was adjusted to 600 rpm at this time. At 58 min after the feed valve was opened, a total of 8440 g of TFE monomer had been fed into the autoclave to maintain pressure. The feed valve was closed, the pressure was observed to drop to 0.16 MPa in 14 min, and the autoclave was vented. Space-time yields were 3.84 g/l·min to feed valve closing and 3.49 g/l·min to autoclave venting. The polymer was recovered, cut to 31 μm average particle size, and dried. The SSG was 2.163 and the shrinkage was 3.5%.

COMPARATIVE EXAMPLE C

The autoclave was charged with demineralized water, C-8, and "Triton" X-100 as in Comparative Example B, and purged of oxygen as before. The autoclave was pressured to 1.83 MPa with 820 g of TFE monomer, heated to 65° C., and agitated at 600 rpm. The reaction was initiated by injecting 0.3 g of APS as 300 ml of 1 g/l solution at 50 ml/min for 6 min. The feed valve was then opened and TFE was fed continuously to maintain pressure at 1.83 MPa. The maximum temperature observed in the vapor space was 80° C. At 77 min after the feed valve was opened, 8720 g of TFE had been fed to maintain pressure and the feed valve was closed. In 4 min the pressure dropped to 0.16 MPa and the autoclave was vented. Space-time yields were 2.99 g/l·min to feed valve closing and 3.11 g/l·min to autoclave venting. The polymer was recovered, cut to 20 μm average particle size, and dried. The SSG was 2.167 and the shrinkage was 4.2%.

SUMMARY OF COMPARATIVE EXAMPLES

Comparative Examples A–C were run at nominally constant temperature. Taken together, they show that shrinkage increases with reaction temperature. This is illustrated graphically in FIG. 1 in which measured shrinkage is plotted against nominal polymerization temperature, i.e., the starting temperature. The that that slight temperature increases were observed indicates that they were run at or near rates corresponding to the heat removal capability of the equipment and cooling fluid at the reaction temperatures chosen. The space-time yield values indicate the sacrifice in productivity incurred to realize PTFE properties attainable at low polymerization temperature.

EXAMPLE 1

The autoclave was charged with 21.3 l of demineralized water, 1 g of oxalic acid, 0.1 g of potassium metabisulfite, 0.7 g of C-8 and 0.0023 g of Triton ®X-100 as in Comparative Example B, and 0.1 g of potassium phosphate. The agitator was turned on at 800 rpm. The autoclave was pressured to 2.17 MPa with approximately 1450 g of TFE and cooled to 15° C. To initiate polymerization, an aqueous solution of potassium permanganate (0.01 g/l) was continuously injected into the autoclave at 25 ml/min for the duration of the reaction. After 15 rain of initiator solution injection, a slight pressure drop was observed indicating start of polymerization (kickoff), the TFE feed valve was opened, and additional TFE monomer was continuously fed into the autoclave to maintain the pressure at 2.17 MPa. As the polymerization reaction proceeded, the temperature in the vapor space continuously increased, and the reaction rate also increased continuously. These observations are summarized in Table 1, which presents temperature and cumulative amount of TFE fed to the autoclave at various times after kickoff (after opening the TFE feed valve). At 54 min after kickoff, 5810 g of TFE had been fed to maintain pressure, temperature and polymerization reaction rate were both increasing rapidly, and the monomer feed valve was closed. The pressure was observed to fall to 0.16 MPa in 3 min, during which time essentially all of the TFE remaining in the autoclave was reacted for a total of about 7260 g of TFE reacted including the precharge. The autoclave was vented and the polymer was recovered, cut to 17 μm average particle size, and dried. The SSG was 2.168 and the shrinkage was 2.8%.

As shown by Table 1, about 76% of the monomer including precharge was converted into polymer at 20° C. or higher, about 61% at 26° C. or higher, and about 37% at 36° C. or higher, assuming that temperature did not drop below 36° C. by the end of the short react-down interval. Space-time yields were 2.84 g/l·min to feed valve closing and 3.36 g/l·min to autoclave venting, values that are substantially higher than obtained in constant low-temperature operation. Thus, despite the fact that a large fraction of the batch was polymerized at higher temperature, the resultant PTFE had shrinkage characteristic of a batch run entirely at or near the 14° C. starting temperature. See Comparative Example A.

TABLE 1

| Temperature and Rate for Example 1 | | | |
|---|---|---|---|
| Time (min) | T (°C.) | TFE fed (g) | PTFE (g) |
| 0 | 14 | 0 | 0 |
| 10 | 16 | 410 | 410 |
| 20 | 17 | 1000 | 1000 |
| 30 | 20 | 1770 | 1770 |
| 40 | 26 | 2860 | 2860 |
| 50 | 36 | 4540 | 4540 |
| 54 | * | 5810 | 5810 |
| 57 | * | 5810 | 7260 |

*Not recorded.

EXAMPLE 2

The autoclave was charged with the same recipe as in Example 1, except that 0.5 g of ammonium perfluorodecanoate was used instead of C-8 and Triton ®X-100, and that the autoclave was pressured to 2.17 MPa with approximately 1630 g of TFE. The batch proceeded in a manner similar to Example 1, but at faster average polymerization rate, as summarized in Table 2. The recovered polymer was cut to 20 μm average particle size and dried as before. The SSG was 2.164 and the shrinkage was 2.9%.

As shown by Table 2, about 84% of the total TFE including precharge was converted into polymer at 22° C. or higher, about 72% at 36° C. or higher, and about 44% at 46° C. or higher, again assuming that temperature did not drop below 46° C. by the end of the short react-down interval. Space-time yields were 3.45 g/l·min to feed valve closing and 4.16 g/l·min to autoclave venting, values that are substantially higher than obtained in constant low-temperature operation. Even in this example, with a larger fraction of PTFE formed at elevated temperature than in Example 1, the resultant PTFE had shrinkage characteristic of a batch run entirely at or near the 16° C. starting temperature. See Comparative Example A.

TABLE 2

| Temperature and Rate for Example 2 | | | |
|---|---|---|---|
| Time (min) | T (°C.) | TFE fed (g) | PTFE (g) |
| 0 | 16 | 0 | 0 |
| 10 | 17 | 540 | 540 |
| 20 | 22 | 1140 | 1140 |
| 30 | 36 | 2000 | 2000 |
| 40 | 46 | 4040 | 4040 |
| 43 | * | 5630 | 5630 |
| 46 | * | 5630 | 7260 |

*Not recorded.

What is claimed is:

1. In the process of suspension polymerization of tetrafluoroethylene using an aqueous medium and in the presence of polymerization initiator to form non-fibrillatable polytetrafluoroethylene, the improvement comprising
    (a) starting the polymerization at a temperature of up to about 20° C.,
    (b) permitting said temperature to increase to an elevated temperature of at least about 30° C. as polymerization progresses, and
    (c) substantially completing the polymerization at said elevated temperature
to obtain as a result thereof polytetrafluoroethylene, having shrinkage characteristic of polytetrafluoroethylene polymerized entirely at said commencing temperature, at production rate greater than obtained when polymerization is carried out entirely at said starting temperature.

2. The process of claim 1 wherein the elevated temperature in (b) is at least about 35° C.

3. The process of claim 1 wherein the elevated temperature in (b) is at least about 40° C.

4. The process of claim 1 wherein at least one comonomer is present in such concentration that the resultant polymer contains no more than about 0.2 mol % of units derived from comonomer.

* * * * *